United States Patent [19]
Summers et al.

[11] 3,915,747
[45] Oct. 28, 1975

[54] PULSE WIDTH MODULATED FUEL CONTROL FOR FUEL CELLS

[75] Inventors: Warren S. Summers, Tolland; Salvatore Fanciullo, Plainville, both of Conn.

[73] Assignee: United Technologies Corporation, Hartford, Conn.

[22] Filed: Nov. 27, 1973

[21] Appl. No.: 419,330

[52] U.S. Cl. ............................................. 136/86 B
[51] Int. Cl. ......................................... H01m 27/12
[58] Field of Search .................................. 136/86 B

[56] References Cited
UNITED STATES PATENTS

| | | | |
|---|---|---|---|
| 3,343,991 | 9/1967 | Koenig | 136/86 B |
| 3,389,018 | 6/1968 | Dowgiallo, Jr. | 136/86 B |
| 3,432,356 | 3/1969 | Christianson | 136/86 B |
| 3,585,078 | 6/1971 | Sederquist et al. | 136/86 B |
| 3,600,229 | 8/1971 | Torkildsen | 136/86 B |
| 3,697,325 | 10/1972 | Baude | 136/86 B |
| 3,745,047 | 7/1973 | Fanciullo et al. | 136/86 B |

OTHER PUBLICATIONS
Cathro, K. S., Fuel control in Methanol–Air and Formaldehyde–Air Fuel Cell Systems in J. Electrochem. Soc. 9/1971 Vol. 118 No. 9 pp. 1523–1529.

Primary Examiner—Allen B. Curtis
Attorney, Agent, or Firm—Donald F. Bradley

[57] ABSTRACT

The injection of fuel into a fuel cell hydrogen generator is controlled by the actuation of a fuel injector valve in response to a pulse width modulated square wave as a function of fuel cell stack operation. The off time of the fuel injector valve is fixed at a constant value by comparison of a ramp voltage produced by a first integrator with a constant reference voltage. The on time of the fuel injector valve is variable and is determined by comparing a ramp voltage from a second integrator with a variable voltage which is a function of fuel stack voltage and fuel cell gross current. A fail-safe circuit is incorporated to insure that the fuel injector does not remain in a continuous on or off state if a malfunction occurs in the control circuitry.

8 Claims, 1 Drawing Figure

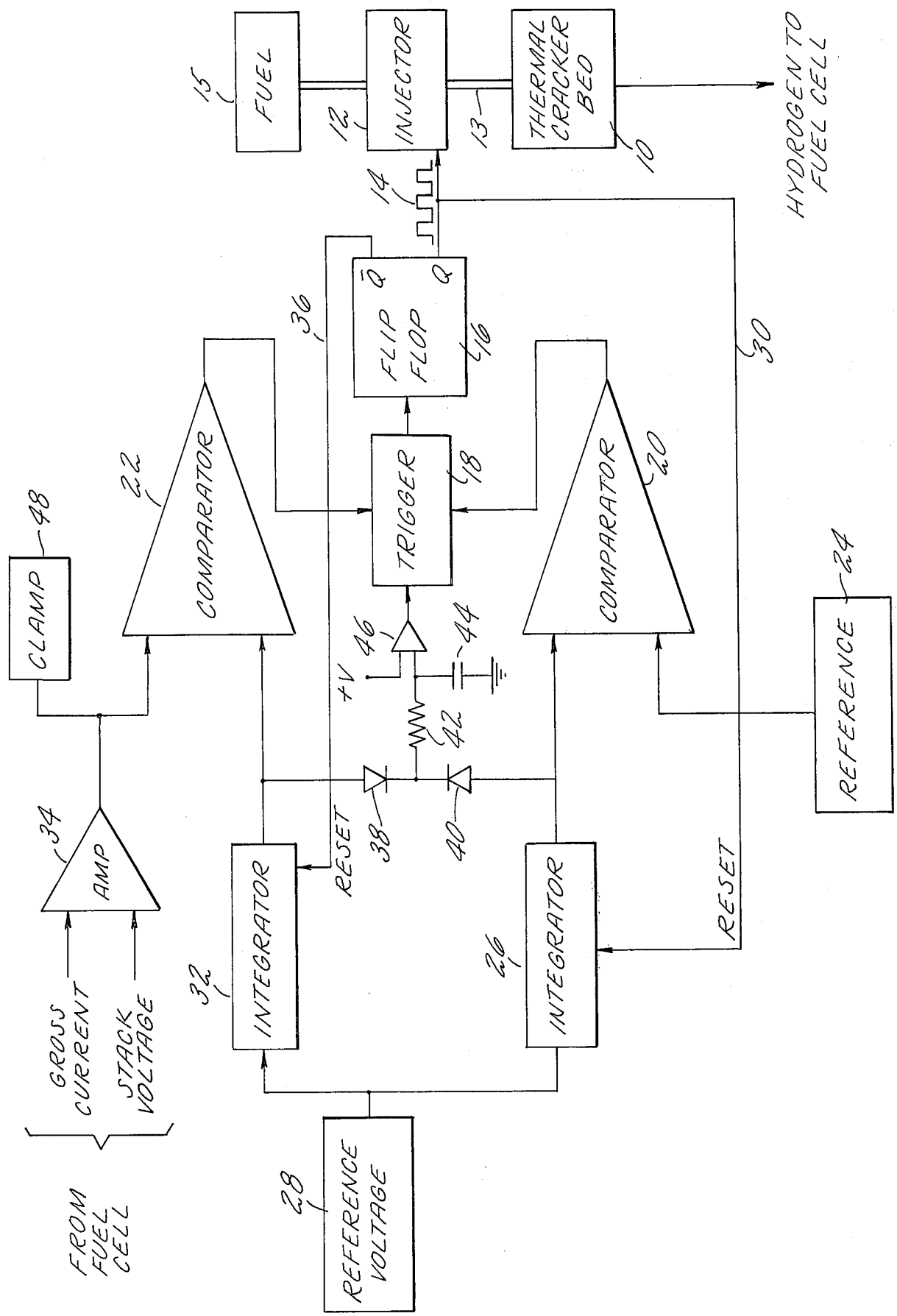

PULSE WIDTH MODULATED FUEL CONTROL FOR FUEL CELLS

BACKGROUND OF THE INVENTION

1. Field of the Invention

This invention relates to fuel cells, and particularly to a fuel control for supplying fuel at the proper rate to a fuel cell hydrogen generator. The fuel flow is a function of the gross current and stack voltage of the fuel cell.

2. Description of the Prior Art

A fuel cell is a device for the conversion of the energy of a chemical reaction between a fuel and an oxidant directly into direct current electricity. A typical cell comprises a fuel electrode, an oxidizing electrode, an electrolyte positioned between the electrodes and means for the introduction of fuel and oxidant to the respective electrodes. The electrical charges produced in the fuel cell are drawn off from the electrodes through an external circuit. Fuel cell powerplants include two separate main sections, the fuel cell proper reacting oxygen or air with hydrogen to produce the electricity, and the hydrogen generator which is sometimes referred to as the reformer or thermal cracker. They hydrogen generator reacts a combination of hydrocarbon fuels to generate hydrogen gas for use in the fuel cell.

In the past, the hydrocarbon fuel supply to the hydrogen generator has been regulated by a variable area ejector, the position of the ejector and therefore the amount of fuel fed to the hydrogen generator being dependent upon fuel cell parameters such as pressures, temperature and current. With a variable area ejector, however, it is necessary for precise control also to know the position of the ejector valve, and it was therefore required to incorporate position feedback mechanisms connected with the ejector itself to produce position information. This requirement added both cost and complexity to the control system.

The present invention controls the flow of fuel to a hydrogen generator to maintain a given fuel cell stack performance level. A fuel flow feedback device as used with the prior art variable area ejector is not required. A constant area injector valve is used instead, and the fuel flow is regulated in an on-off manner by a pulse width modulated square wave produced in control circuitry as a function of fuel cell parameters. Fuel flow is determined from the inherent injector characteristic response to the modulating pulse.

SUMMARY OF THE INVENTION

In accordance with the present invention, there is described a fuel control for supplying fuel to a hydrogen generator in a fuel cell powerplant. An injector valve is turned on and off at a rate and for a time determined by the gross current and stack voltage of the fuel cell. A pulse width modulated square wave is applied to the constant area injector valve, the square wave producing a constant off time and an on time which varies in accordance with the desired fuel flow.

In accordance with another aspect of the present invention, both the on and off time of the injector valve are controlled by comparing a linear ramp voltage produced in an integrator with a reference voltage. To produce a fixed off time, the ramp voltage from the integrator is compared with a fixed reference voltage. To produce the variable on time, the ramp voltage from an integrator is compared with a voltage variable as a function of fuel cell gross current and stack voltage. The off time may also be varied rather than constant to regulate the ratio of on to off time and thereby increase the range of control.

In accordance with another aspect of the present invention, a fail-safe circuit is incorporated to insure that switching of the injector from one state to the other occurs at a regular interval and that the injector valve does not remain in a continuous on or off state if a malfunction occurs in the control circuit.

BRIEF DESCRIPTION OF THE DRAWING

The FIGURE shows schematically in block diagram form the elements of the pulse width modulated fuel cell control system of the present invention.

DESCRIPTION OF THE PREFERRED EMBODIMENT

The hydrogen generator of the present invention will be described as a thermal cracker, although it will be apparent that the inventive concepts are also applicable to a reformer. Referring to the FIGURE, there is shown a cracker bed 10 into which hydrocarbon fuel is supplied through a fixed area injector 12. A modulated output pulse shown by reference numeral 14 is fed through any well-known driver or amplifier circuits (not shown) to the injector 12 from the Q-output terminal of a flip flop 16. When the Q-output from the flip flop is at a voltage level which will be referred to as a 1 state, the $\overline{Q}$ output flip flop 16 will be at a voltage level which will be referred to as a 0 state. Conversely when the Q output is in the 0 state, the $\overline{Q}$ output will be in the 1 state. The flip flop is caused to change state as the result of a pulse received from a trigger circuit 18. Injector 12 will supply fuel therethrough to the cracker bed via line 13 from fuel supply 15 only when the Q-output from the flip flop 16 is a 1. A 0 from the Q-output of flip flop 16 will close injector valve 12.

Feeding the trigger circuit 18 are a pair of voltage comparators 20 and 22 which feed either a positive or negative voltage into the trigger circuit 18 depending on the inputs to the comparators. A change in state of the comparators 20 or 22 such as from a positive to a negative output voltage will be sensed by trigger circuit 18 and will cause the trigger circuit 18 to produce a trigger pulse which is fed to flip flop 16 to cause the flip flop to change its output state, i.e., both the Q and $\overline{Q}$ outputs will change from their respective 0 and 1 states to the opposite state.

The two inputs to comparator 20 are a source of constant reference voltage 24 and the output from an integrator 26 to which is supplied a reference voltage 28. The integrator 26 responds to the state of the Q-output of flip flop 16 via line 30. A 0 from the Q-output of flip flop 16 appearing on line 30 permits operation of integrator 26 by turning off a reset and inhibit function. The integrator 26 generates a linear ramp output voltage which is fed to comparator 20. When the increasing output voltage from the integrator 26 exceeds the DC reference voltage provided as shown in block 24, the output voltage from comparator 20 switches states initiating a pulse from trigger 18 which causes both the Q and $\overline{Q}$-outputs from flip flop 16 to change to the opposite state. The output terminal Q of flip flop 16 will thereupon become a 1 and a reset pulse will be fed to integrator 26 via line 30 to reset and inhibit the operation of the integrator 26.

The two inputs to comparator 22 comprise the output from an integrator 32 which is preferably identical to integrator 26, and the output from an operational amplifier 34. The voltage output from amplifier 34 acts in the manner analogous to the reference voltage 24. The inputs to amplifier 34 are voltage signals proportional to gross current and stack voltage from the fuel cell, the operational amplifier 34 producing an output voltage which is a function of the two inputs. The function may be linear or nonlinear. When the output from the $\overline{Q}$ terminal of flip flop 16 appearing on line 36 is a 0, integrator 32 will generate a linear ramp voltage which is fed to comparator 22. When the ramp voltage exceeds the output voltage produced by amplifier 34 and fed to comparator 22, the comparator will switch from a positive to a negative output voltage which is fed to trigger circuit 18 initiating a trigger pulse which is in turn fed to flip flop 16 and causes a change in state of flip flop 16. The $\overline{Q}$-output will then switch from a 0 to a 1 and a reset pulse will be fed to integrator 32 via line 36, turning off the integrator 32. The Q-output will switch from a 1 to a 0.

Since integrator 26 produces a linear ramp voltage which is compared with a constant DC voltage produced by reference 24, it will be apparent that the time of the 0 output from terminal Q of flip flop 16 will be identical for each cycle. If the injector 12 is controlled in response to the square wave 14 produced from the Q-output of flip flop 16 such that no fuel is injected during the 0 time of the square wave 14, the off time will be constant for each cycle. The on time of the injector 12, that is, the time during which fuel is injected into the cracker bed 10, is determined by the time that the Q-output from flip flop 16 is in the 1 state, which is in turn determined by the magnitude of the voltage produced at the output of operational amplifier 34. Since this voltage is a variable, the shape of the square wave 14 and the on time of the injector 12 will be variable with the output voltage from amplifier 34.

It is apparent that the off time of the injector 12, i.e., the 0 output from the Q-terminal of flip flop 16, may be variable rather than fixed. If the reference voltage 24 is replaced by a voltage which is a function of some other parameter, the off time can be varied as well as the on time. The range of control, i.e., the ratio of on to off time, can be controlled in this manner.

A clamp circuit 48 may be connected to the output of operational amplifier 34 to insure that the voltage fed to comparator 22 from amplifier 34 and hence the output from comparator 22 which controls fuel flow is maintained within a predetermined range. The clamp circuit 48 clamps the output voltage from amplifier 34 so that it does not exceed either upper or lower fixed limits. Any conventional clamp circuit having a fixed upper and lower limit may be used. The purpose of the clamp is to maintain at least a minimum fuel flow through injector 12 as required to sustain production of hydrogen and/or a minimum reformer temperature. An upper limit of fuel flow is desired for reasons of safety.

Since the output from flip flop 16 is determined by pulses produced by trigger circuit 18, it is essential that the trigger circuit respond to each change in state of the comparators 20 and 22. If a malfunction occurs or if the trigger circuit 18 does not respond to the output from the comparators, the Q-output terminal of flip flop 16 will remain in its last output state and injector 12 will be locked in either an on or off condition. It is possible, for example, that noise in the system will mask the output from one of the comparators 20 or 22 and that trigger circuit 18 will not respond to a change in state of the comparators. To insure that injector 12 does not remain locked in either an on or off state, a fail-safe circuit is connected to receive the output voltages from integrators 26 and 32 and to actuate trigger circuit 18 independently of comparators 20 or 22 when the outputs from either of the integrators 26 or 32 reaches a predetermined voltage level. As shown in the FIGURE, diodes 38 and 40 are connected respectively to pass the output voltage produced by integrators 32 and 26 through a resistor 42 to charge a capacitor 44. The capacitor voltage is connected as one input to a unijunction transistor 46. A constant DC reference voltage +V is also connected as an input to unijunction transistor 46. If the comparators 20 or 22 fail to actuate trigger circuit 18 at the proper time, the capacitor 44 will charge to a sufficiently high voltage to actuate unijunction transistor 46, and the transistor will pulse to actuate trigger circuit 18 which will in turn cause flip flop 16 to change its state. The fail-safe circuit also insures that the integrators do not saturate.

By means of the control system described herein much more precise operation of the fuel cell is attained. Improved fuel consumption efficiency is provided, and fuel cell output variations due to cracker bed differences are minimized when a dual bed thermal cracker is used to generate the hydrogen. The electronic pulse width modulation control permits the fuel flow to be regulated without the necessity of a mechanical valve such as a variable area ejector. The use of gross current and stack voltage to control the fuel flow allows the fuel cell to respond to normal power demands in a more efficient manner. The control also permits the use of different fuels in the hydrogen generator without changing the performance of the fuel cell powerplant.

While the present invention has been described in terms of its preferred embodiment, it is apparent that numerous changes may be made to the features of the invention without departing from the scope of the invention as hereinafter claimed.

We claim:

1. In a hydrogen generator for supplying hydrogen to a fuel cell, a control for regulating the flow of fuel into said hydrogen generator to maintain a selected performance level of said fuel cell comprising a constant area injector valve positioned in the fuel flow path, means for cyclically modulating said valve between a fully opened and a fully closed position, means responsive to the power produced in said fuel cell for producing a control signal, a first integrator for producing a reference signal, comparator means for comparing said control signal with said reference signal and producing in response thereto a first actuating signal, means connecting said first actuating signal with said cyclic modulating means for varying the time that said valve is open during each cycle, and means for producing a second actuating signal and connecting said second actuating signal with said cyclic modulating means for causing said valve to be maintained in its closed position for a fixed time during each cycle.

2. A control as in claim 1 in which said means responsive to the power produced in said fuel cell includes means responsive to the gross current and the output voltage generated in said fuel cell.

3. A control as in claim 1 in which said means for cyclically modulating said valve includes a bistable signal generator producing an output signal which alternately varies between a first signal level and a second signal level, said valve being maintained in its open position when said output signal is at said first signal level and in its closed position when said output signal is at said second signal level, said bistable signal generator being responsive to said first actuating signal for varying the time duration of said first signal level, and being responsive to said second actuating signal for controlling the time duration of said second signal level.

4. A control as in claim 3 in which the reference signal produced by said first integrator is a first ramp voltage,
means for actuating said integrator when the output signal from said bistable signal generator is at its first signal level,
said comparator producing said first actuating signal when the magnitude of said first ramp voltage exceeds the magnitude of said control signal,
and trigger means responsive to the occurrence of said first actuating signal for causing the output signal from said bistable signal generator to switch to said second signal level.

5. A control as in claim 4 in which said means for producing said second actuating signal includes a second integrator producing a second ramp voltage,
a source of constant voltage,
and means for comparing said constant voltage with the second ramp voltage produced by said second integrator.

6. A control as in claim 5 and including means for actuating said second integrator when said output signal is at said second signal level, said trigger means being responsive to the occurrence of said second actuating signal for causing said output signal to switch to its first signal level.

7. A fuel control as in cliam 6 and further including means for sensing the magnitude of said first and second ramp voltage signals,
and means for causing said output signal to switch from one to the other of said first and second signal levels when the magnitude of either of said first and second ramp voltage signals exceeds a predetermined voltage level.

8. A fuel control as in claim 7 and including means for inhibiting said first integrator when said output signal is at said second signal level,
and means for inhibiting said second integrator when said output signal is at said first signal level.

* * * * *

UNITED STATES PATENT OFFICE
CERTIFICATE OF CORRECTION

PATENT NO. : 3,915,747
DATED : October 28, 1975
INVENTOR(S) : Warren S. Summers and Salvatore Fanciullo It is certified that error appears in the above-identified patent and that said Letters Patent are hereby corrected as shown below:

Column 1, after line 10, the following paragraph should be inserted --The invention herein described was made in the course of or under a contract or subcontract thereunder, with the Department of the Army.--

Signed and Sealed this seventeenth Day of February 1976

[SEAL]

Attest:

RUTH C. MASON
Attesting Officer

C. MARSHALL DANN
Commissioner of Patents and Trademarks